July 28, 1925.
I. F. FICKAS
MEANS FOR PREPARING TAMALE HUSKS
Filed Aug. 18, 1924    2 Sheets-Sheet 2
1,547,741
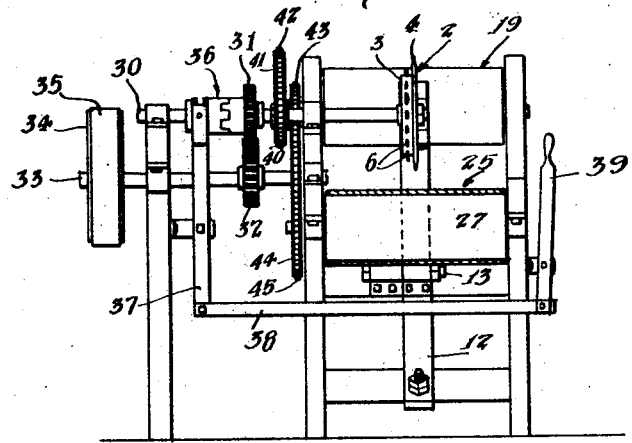
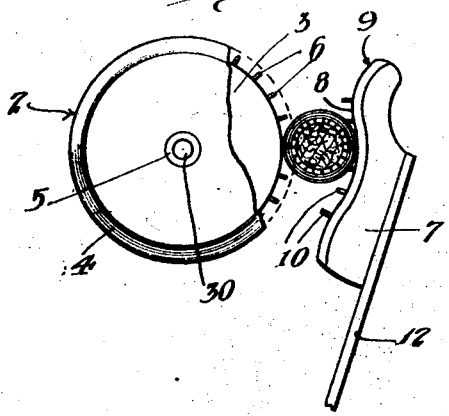
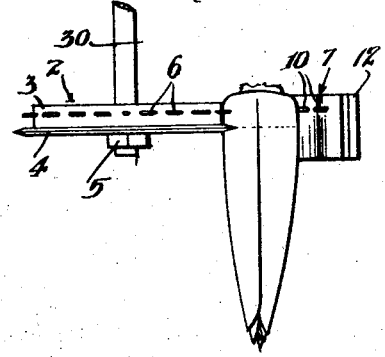
Inventor
Irvin F. Fickas
By Lyon & Lyon
Attorneys Patented July 28, 1925.

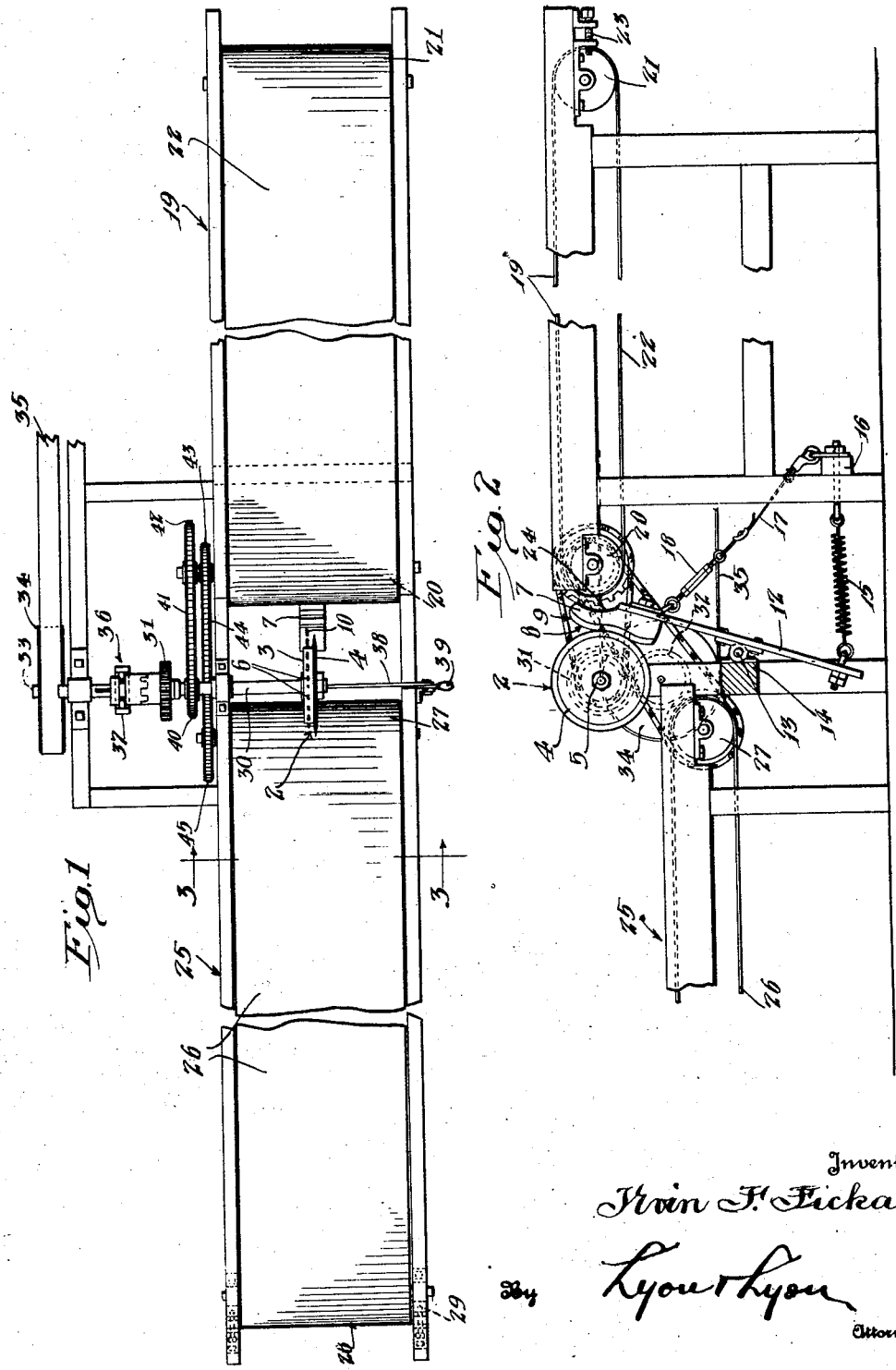

1,547,741

UNITED STATES PATENT OFFICE.

IRVIN F. FICKAS, OF SANTA ANA, CALIFORNIA.

MEANS FOR PREPARING TAMALE HUSKS.

Application filed August 18, 1924. Serial No. 732,672.

*To all whom it may concern:*

Be it known that I, IRVIN F. FICKAS, a citizen of the United States, residing at Santa Ana, in the county of Orange and State of California, have invented a new and useful Means for Preparing Tamale Husks, of which the following is a specification.

This invention relates to means for cutting husks from corn in order to prepare a husk suitable for the manufacture and preparation of tamales.

In the preparation of tamales, a considerable amount of corn husks are employed as wrappers for the tamale. For this purpose it is necessary to have the corn husks of large size and provided with neat, uniform and clean edges where the husks are separated from the cobs. The majority of methods and means for removing husks from seed corn destroys the husk for such purpose and hitherto the tamale manufacturer has largely depended upon husks cut from the corn entirely by hand, employing some form of butcher knife, or the like. The cost of so husking corn to supply suitable husk for tamale purposes, is very great.

An object of the present invention is to provide an apparatus by which corn may be husked at a relatively low cost while providing a properly cut husk for tamale use.

Various other objects and advantages of this invention will appear from a description of the preferred example of the apparatus in which the invention is embodied. Reference is therefore made to the accompanying drawings illustrating one example of the apparatus by which the husk cutting method may be employed.

In the drawings:

Figure 1 is a plan view of a preferred form of husk cutting apparatus.

Fig. 2 is an elevation of the apparatus shown in Fig. 1.

Fig. 3 is an elevation in vertical section on the line 3—3 of Fig. 1.

Fig. 4 is an enlarged elevation of the husk cutting shoe illustrating the position of an ear of corn therein; and Fig. 5 is a plan view of the cutter and shoe disclosing the position at which the ear of corn is fed thereto.

In the drawings, 2 indicates a rotatable husk cutting or severing member comprising a cylindrical plate or body 3, the forward side of which is attached to a disc knife 4 of larger diameter than the body 3. This disc knife is preferably detachably secured to the body 3 in any suitable manner, such as by bolts 5. The disc knife 4 lies in a vertical plane and the body 3 of the cutter is provided with a plurality of radial prongs 6 extending outward from the cylindrical surface of the body but preferably extending a less distance from the body 3 than the edge of the disc knife 4.

7 indicates a shoe juxtapositioned with reference to the cutter 2 so as to hold an ear in position to be acted upon by the cutter 2, the shoe 7 having its face 8 adjacent the cutter 2 curved to correspond somewhat with the curvature of the knife 4; the upper end of such face, however, is curved backwardly as at 9 to facilitate feeding the ears between the shoe and cutter. The shoe 7 is provided with a series of prongs 10 extending towards the knife 2.

The shoe 7 is carried by a pivotally mounted support 12, the support being pivoted near its center as indicated at 13 to a post 14 of a frame of the apparatus, the pivot point 13 being located below the cutter 2 and nearly in alinement therewith. The support 12 is connected to a tension spring 15 at its lower end, the opposite end of the spring 15 being attached to a fixed post 16 of the frame, the spring 15 thus comprising means operated to yieldingly urge the shoe 7 towards the cutter. Near the upper end of the support 12, the support is connected to a belt 17 through an adjusting member 18, said belt being also connected to the post 16 and operates to limit the movement of the shoe 7 towards the cutter 2. The member 18 may constitute any suitable extensible connection operative to vary the limit position of the shoe 7.

19 indicates a conveyor operated to feed cobs towards the shoe side of the cutter 2. The conveyor 19 comprises a suitable frame mounting horizontal rollers 20 and 21 over which an endless belt 22 is passed, the roller 21 being provided with adjustable bearing 23 by which the position of the roller may be varied to properly tighten the belt 19 thereon. The roller 20 is positioned close to the shoe 7 and the shoe 7 is shown with its back 24 adjacent the roller cut away to permit the shoe 7 to pivot back close to the roller during the cob husking operations.

The belt is disposed at substantially the same level as the upper end of the shoe 7.

Below the cutter 2 and extending away therefrom, is provided a delivery conveyor 25 including an endless belt 26 passing over rollers 27 and 28 at its end, the roller 27 being close to the knife 2 but disposed somewhat therebelow. The roller 27 is preferably mounted upon an adjustable bearing 29 by which the position of the roller 28 may be adjusted to tighten the belt 26.

In practice, the conveyor 19 is continually operated to carry ears toward the shoe 7 and the conveyor 25 continually operated to carry ears away from the cutter 2. These conveyors may be driven by any preferred mechanism, it being preferable that the conveyor 19 should be driven somewhat faster than the conveyor 25 for the reasons hereinafter set forth.

In the drawings the cutter 2 is illustrated as carried by a horizontal shaft 30 extending rearwardly from the conveyors and there provided with a gear 31 engageable with a gear 32 on a driven shaft 33 mounting a pulley 34, it being understood that the pulley 34 may be driven by a belt 35 from any suitable source of power. The gear 31 may be released from the shaft 30 by operation of a clutch 36, the clutch 36 being controlled by a pivotally mounted clutch-control arm 37 pivotally connected to a rod 38 extending to the front side of the apparatus and there connected to a pivotally mounted lever 39. The shaft 30 likewise carries a sprocket wheel 40 which connects the shaft through chain 41 to a sprocket wheel 42 on the roller 20. The roller 20 also carries a sprocket wheel 43 over which a chain 44 passes, the chain driving a sprocket wheel 45 on the roller 27. The gearing between rollers 27 and 20 is preferably such that the conveyor 19 will be driven at twice the rate of the conveyor 26.

In husking corn the apparatus is set in operation and ears of corn are placed on the conveyor 19 in any suitable manner, such as by hand, and approach the rotatable cutter 2. An operator stands in front of the cutter 2 and grasps each ear approaching on the belt and places the same between the shoe 7 and cutter 2 so that the stem of the ear is in position to be engaged by the prongs 6 and 10 of the cutter 2 and shoe 7, respectively, the remainder of the ear extending forward as shown in Fig. 5. The rotation of the cutter 2 then forces the ear between the cutter 2 and shoe 7, the shoe 7 yielding to permit the ear to pass therethrough, the prongs 10 on the shoe preventing the ear shooting past the shoe while the prongs 6 upon the cutter cause the ear to rotate so that all sides of the ear are presented to the knife 4. The spring 15 forces the prongs 6 and 10 by the kernals of the cob where the prongs hold the knife 4 from cutting entirely through the cob but insure the knife cutting entirely through the husk of the corn. The ears discharged from the cutter are grasped and delivered to the conveyor 26 where other workers may receive the same to separate the severed husk and remainder of the ear. The husk of the ear is in this manner cut clean therefrom without tearing or damaging the husk and is of great value for wrapping tamales.

It is thus seen that the prong 6 upon the cutter 2 constitutes an ear-gripping means or members and also means for rotating the ear while it is in engagement with the knife 4. The prongs 10 upon the shoe constitute gripping means operative to hold the ear during such operation.

While the invention is shown in its preferred form, it is understood that various modifications may be made without departing from the spirit of the invention, and the invention is therefore not limited to the details of the apparatus described, but is of the scope set forth in the appended claims.

I claim:

1. In a device of the class described, a rotatable cutter carrying the ear-gripping and rotating means, and a shoe disposed to maintain an ear in contact with said cutter during a husk cutting operation, the shoe having ear gripping members.

2. In a husk cutting apparatus, the combination of a rotatable cutter having means to limit the depth of the cut into an ear, a shoe operative to maintain the ear in cutting relation with the cutter, and means for rotating the ear during such cutting action.

3. In a husk cutting apparatus, a rotatable cutter, a shoe adjacent the cutter, means yieldingly urging the shoe towards the cutter, and prongs on the cutter and shoe.

4. In a husk cutting apparatus, a rotatable cutter, a shoe adjacent the cutter, means yieldingly urging the shoe towards the cutter, and prongs on the cutter and shoe, the cutter including a detachable disc knife.

5. In a husk cutting apparatus, a husk severing means, means for presenting an ear of corn to said means, means for rotating such ear while presenting the same to the severing means.

6. A device of the class described, comprising, in combination, a rotatable husk severing member, means for presenting an ear to said member, means for rotating the ear while presented to the severing member, and stop means operative to limit the penetration of the severing member into the ear operated on.

7. A device of the class described, comprising a rotatable husk severing member, stop means on said member to limit the penetration of the member into an ear, means including a yieldingly mounted shoe for presenting an ear to the severing member, and means on the shoe cooperating with said stop means for rotating the ear during the severing operation.

8. A device of the class described, comprising a rotatable husk severing member, means for presenting an ear to said member, means for rotating said ear while presented to the severing means, and means for feeding ears towards the severing member.

9. A device of the class described comprising a rotatable husk severing member, yieldingly mounted means for presenting an ear to the severing member, means for rotating the ear while presented to the severing means, and means for feeding ears towards the severing member, and means for carrying ears from the severing member.

Signed at Los Angeles California, this 11th day of August 1924.

IRVIN F. FICKAS.